(12) United States Patent
Shapiro

(10) Patent No.: US 7,278,221 B1
(45) Date of Patent: Oct. 9, 2007

(54) ANGLE MEASUREMENT TOOL

(76) Inventor: Marc Lev Shapiro, 1931 Martha's Rd., Alexandria, VA (US) 22307

( * ) Notice: Subject to any disclaimer, the term of this patent is extended or adjusted under 35 U.S.C. 154(b) by 0 days.

(21) Appl. No.: 11/401,906

(22) Filed: Apr. 12, 2006

(51) Int. Cl.
*B43L 7/10* (2006.01)
(52) U.S. Cl. .............................. 33/471; 33/495; 33/534
(58) Field of Classification Search .................. 33/471, 33/1 N, 452, 465, 534, 538, 276, 278, 451, 33/194, DIG. 21
See application file for complete search history.

(56) References Cited

U.S. PATENT DOCUMENTS

| | | | | |
|---|---|---|---|---|
| 1,585,563 A | * | 5/1926 | Schlattau | 33/471 |
| 4,394,801 A | * | 7/1983 | Thibodeaux | 33/496 |
| 4,920,658 A | * | 5/1990 | Hile | 33/499 |
| 5,020,233 A | * | 6/1991 | Syken | 33/465 |
| 5,392,525 A | * | 2/1995 | Chow | 33/465 |
| 5,459,935 A | * | 10/1995 | Paulson et al. | 33/451 |
| 5,475,931 A | * | 12/1995 | Wei | 33/471 |
| 5,842,282 A | * | 12/1998 | Ting | 33/227 |
| 6,141,882 A | * | 11/2000 | Syken | 33/471 |
| 6,167,630 B1 | * | 1/2001 | Webb | 33/354 |
| 6,237,238 B1 | * | 5/2001 | Shapiro | 33/471 |
| 7,047,655 B2 | * | 5/2006 | Larsson | 33/471 |
| 2003/0051358 A1 | * | 3/2003 | Kruse | 33/471 |
| 2004/0172839 A1 | * | 9/2004 | Zirk et al. | 33/451 |
| 2006/0005408 A1 | * | 1/2006 | Fernand | 33/471 |

* cited by examiner

*Primary Examiner*—Christopher W Fulton
(74) *Attorney, Agent, or Firm*—Herman Hohauser

(57) ABSTRACT

An angle measurement tool having two legs held together by a removable adjustment member in which the legs are joined together about a common axis so that one of the legs rotates with respect to the other to form a desired angle the value of which is read using indexing means located on both legs.

14 Claims, 13 Drawing Sheets

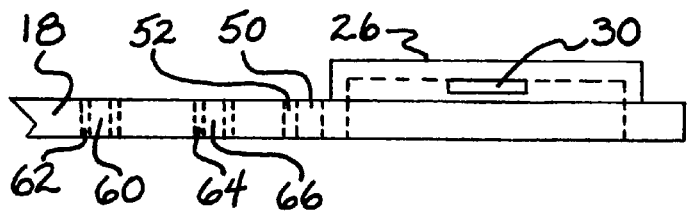
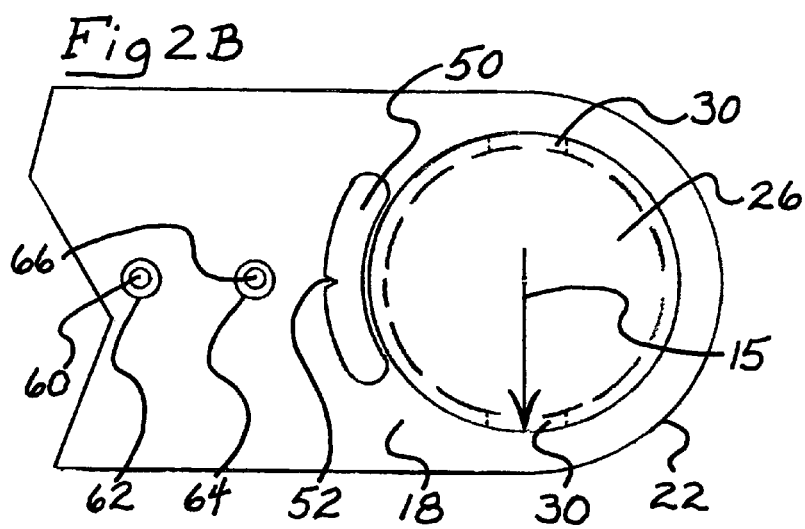
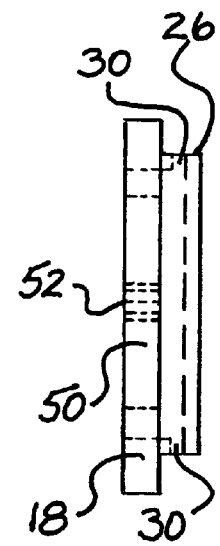
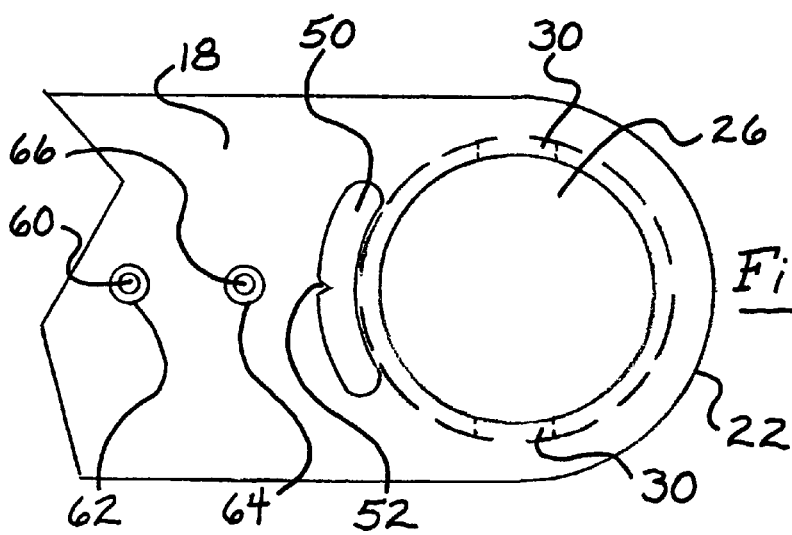

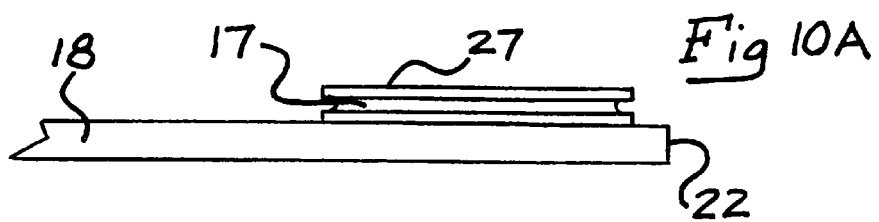
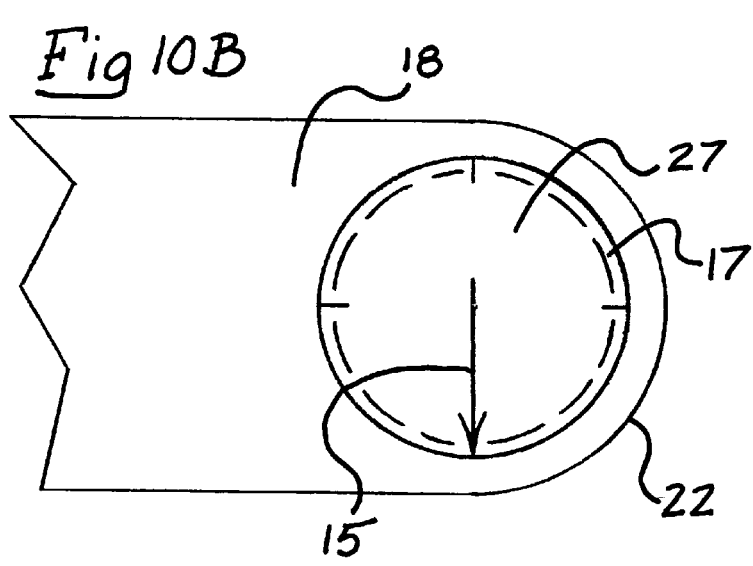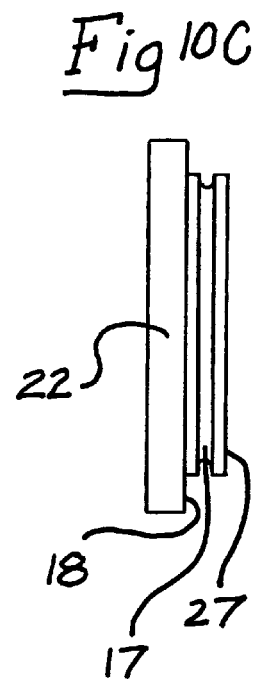
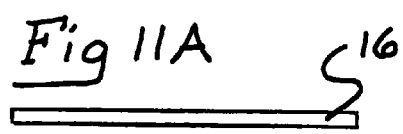
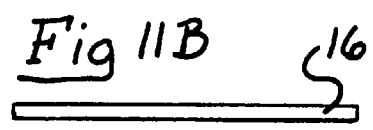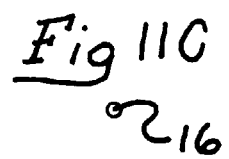

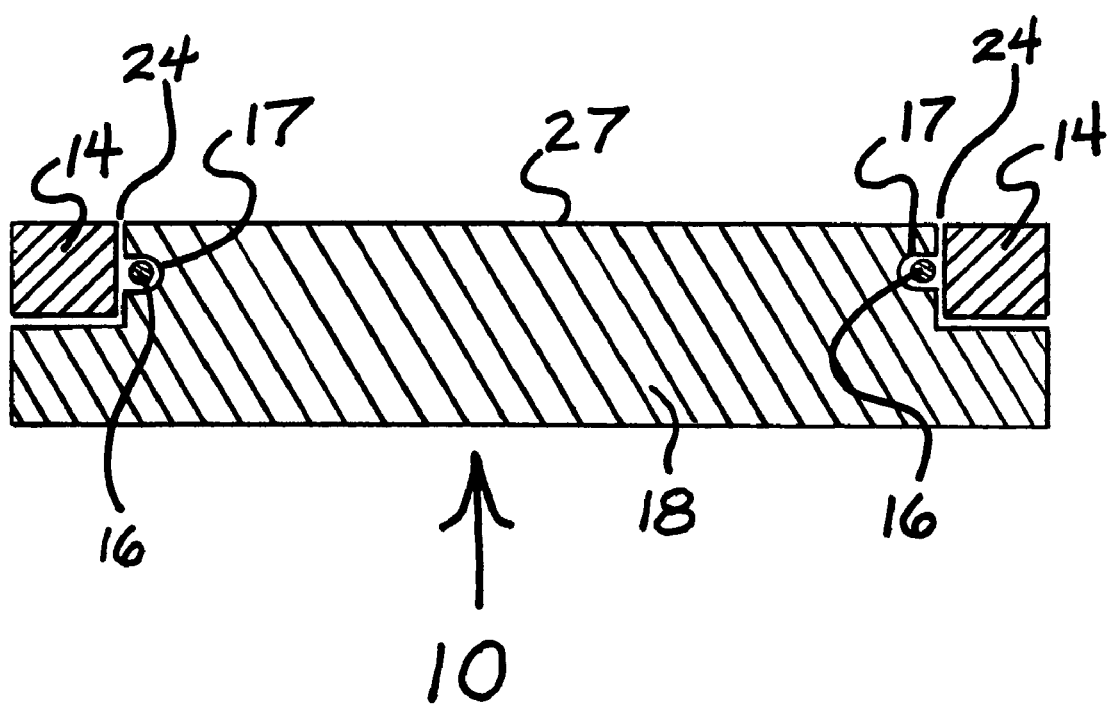

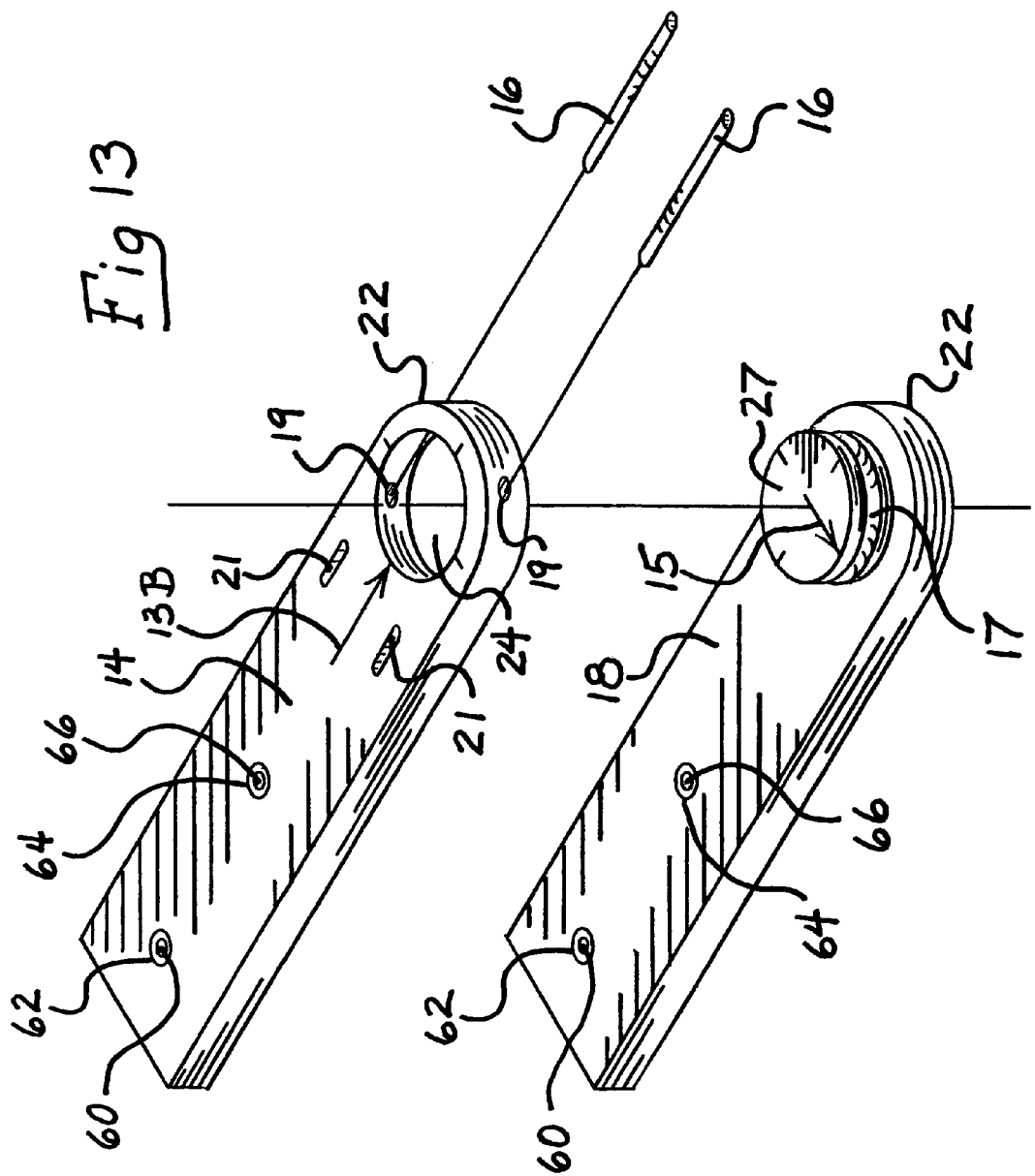

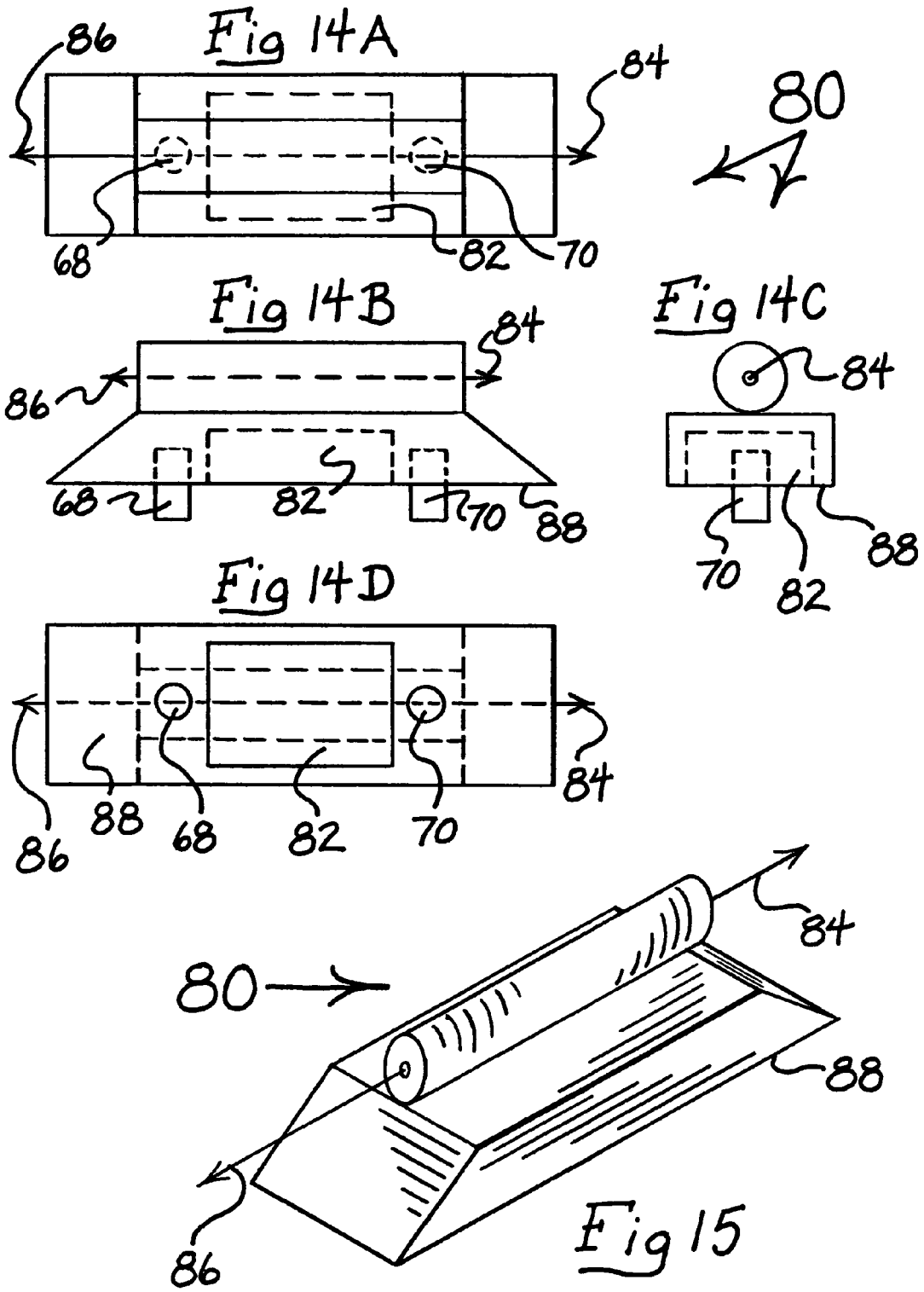

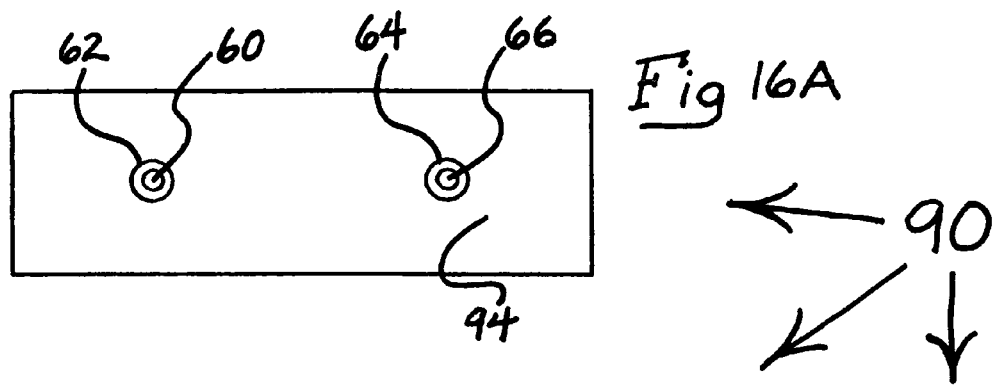
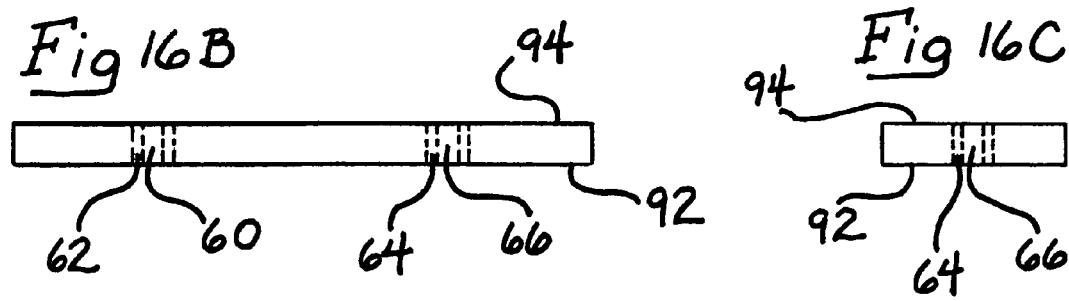
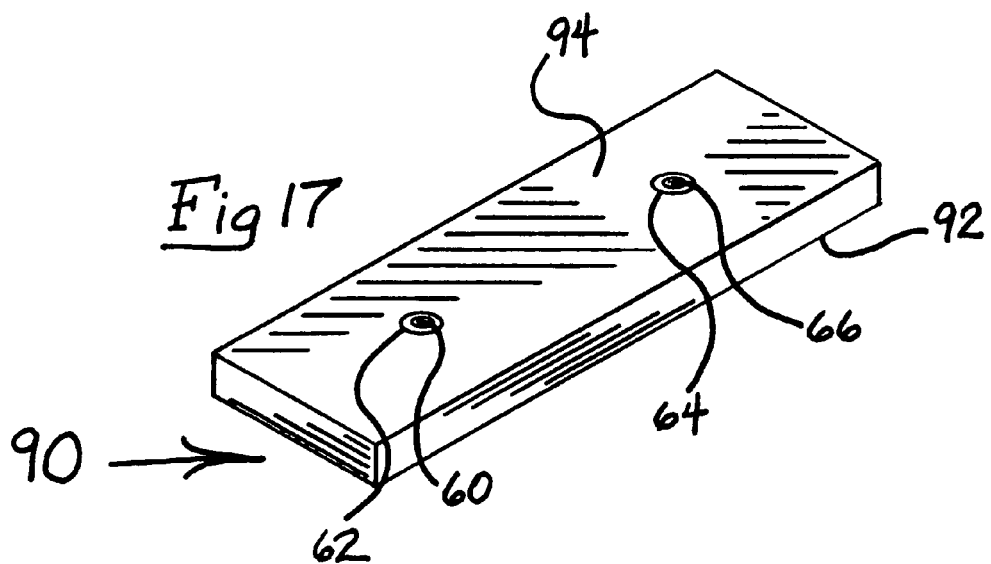

Fig 18

COMPOUND CUT CONVERSIONS
The 3 Std. Crown Mould Wall Spring Angles
(used for cutting crown as it lays flat)
Read the RED "Miter Cut" Scale on
the dial. Convert that reading here.
Setting The "MITER" Angle:
Set this angle on the saw base.
Setting The "BEVEL" Angle:
'Tilt' the saw blade to this angle.

| "MITER CUT" | 52° Spring | | 45° Spring | | 38° Spring | |
|---|---|---|---|---|---|---|
| | MITER | BEVEL | MITER | BEVEL | MITER | BEVEL |
| 1 | 0.6 | 0.8 | 0.7 | 0.7 | 0.8 | 0.6 |
| 2 | 1.2 | 1.6 | 1.4 | 1.4 | 1.6 | 1.2 |
| 3 | 1.9 | 2.4 | 2.1 | 2.1 | 2.4 | 1.8 |
| 4 | 2.5 | 3.2 | 2.8 | 2.8 | 3.2 | 2.5 |
| 5 | 3.1 | 3.9 | 3.5 | 3.5 | 3.9 | 3.1 |
| 6 | 3.7 | 4.7 | 4.3 | 4.2 | 4.7 | 3.7 |
| 7 | 4.3 | 5.5 | 5.0 | 4.9 | 5.5 | 4.3 |
| 8 | 5.0 | 6.3 | 5.7 | 5.7 | 6.3 | 4.9 |
| 9 | 5.6 | 7.1 | 6.4 | 6.4 | 7.1 | 5.5 |
| 10 | 6.2 | 7.9 | 7.1 | 7.1 | 7.9 | 6.1 |
| 11 | 6.8 | 8.7 | 7.8 | 7.8 | 8.7 | 6.7 |
| 12 | 7.5 | 9.4 | 8.6 | 8.5 | 9.5 | 7.4 |
| 13 | 8.1 | 10.2 | 9.3 | 9.2 | 10.3 | 8.0 |
| 14 | 8.7 | 11.0 | 10.0 | 9.9 | 11.1 | 8.6 |
| 15 | 9.4 | 11.8 | 10.7 | 10.6 | 11.9 | 9.2 |
| 16 | 10.0 | 12.5 | 11.5 | 11.2 | 12.7 | 9.8 |
| 17 | 10.7 | 13.3 | 12.2 | 11.9 | 13.5 | 10.4 |
| 18 | 11.3 | 14.1 | 12.9 | 12.6 | 14.4 | 11.0 |
| 19 | 12.0 | 14.9 | 13.7 | 13.3 | 15.2 | 11.6 |
| 20 | 12.6 | 15.6 | 14.4 | 14.0 | 16.0 | 12.2 |
| 21 | 13.3 | 16.4 | 15.2 | 14.7 | 16.8 | 12.7 |
| 22 | 14.0 | 17.2 | 15.9 | 15.4 | 17.7 | 13.3 |
| 23 | 14.7 | 17.9 | 16.7 | 16.0 | 18.5 | 13.9 |
| 24 | 15.3 | 18.7 | 17.5 | 16.7 | 19.3 | 14.5 |
| 25 | 16.0 | 19.5 | 18.3 | 17.4 | 20.2 | 15.1 |
| 26 | 16.7 | 20.2 | 19.0 | 18.1 | 21.0 | 15.7 |
| 27 | 17.4 | 21.0 | 19.8 | 18.7 | 21.9 | 16.2 |
| 28 | 18.1 | 21.7 | 20.6 | 19.4 | 22.7 | 16.8 |
| 29 | 18.8 | 22.5 | 21.4 | 20.1 | 23.6 | 17.4 |
| 30 | 19.6 | 23.2 | 22.2 | 20.7 | 24.5 | 17.9 |
| 31 | 20.3 | 23.9 | 23.0 | 21.4 | 25.3 | 18.5 |
| 32 | 21.0 | 24.7 | 23.8 | 22.0 | 26.2 | 19.0 |
| 33 | 21.8 | 25.4 | 24.7 | 22.7 | 27.1 | 19.6 |
| 34 | 22.6 | 26.2 | 25.5 | 23.3 | 28.0 | 20.1 |
| 35 | 23.3 | 26.9 | 26.3 | 23.9 | 28.9 | 20.7 |
| 36 | 24.1 | 27.6 | 27.2 | 24.6 | 29.8 | 21.2 |
| 37 | 24.9 | 28.3 | 28.1 | 25.2 | 30.7 | 21.7 |
| 38 | 25.7 | 29.0 | 28.9 | 25.8 | 31.6 | 22.3 |
| 39 | 26.5 | 29.7 | 29.8 | 26.4 | 32.5 | 22.8 |
| 40 | 27.3 | 30.4 | 30.7 | 27.0 | 33.5 | 23.3 |
| 41 | 28.2 | 31.1 | 31.6 | 27.6 | 34.4 | 23.8 |
| 42 | 29.0 | 31.8 | 32.5 | 28.2 | 35.4 | 24.3 |
| 43 | 29.9 | 32.5 | 33.4 | 28.8 | 36.3 | 24.8 |
| 44 | 30.7 | 33.2 | 34.3 | 29.4 | 37.3 | 25.3 |
| 45 | 31.6 | 33.9 | 35.3 | 30.0 | 38.2 | 25.8 |
| 46 | 32.5 | 34.5 | 36.2 | 30.6 | 39.2 | 26.3 |
| 47 | 33.4 | 35.2 | 37.2 | 31.1 | 40.2 | 26.8 |
| 48 | 34.4 | 35.9 | 38.1 | 31.7 | 41.2 | 27.2 |
| 49 | 35.3 | 36.5 | 39.1 | 32.3 | 42.2 | 27.7 |
| 50 | 36.3 | 37.1 | 40.1 | 32.8 | 43.2 | 28.1 |
| 51 | 37.2 | 37.8 | 41.1 | 33.3 | 44.2 | 28.6 |
| 52 | 38.2 | 38.4 | 42.2 | 33.9 | 45.2 | 29.0 |
| 53 | 39.3 | 39.0 | 43.2 | 34.4 | 46.3 | 29.5 |
| 54 | 40.3 | 39.6 | 44.2 | 34.9 | 47.3 | 29.9 |
| 55 | 41.3 | 40.2 | 45.3 | 35.4 | 48.4 | 30.3 |
| 56 | 42.4 | 40.8 | 46.4 | 35.9 | 49.4 | 30.7 |
| 57 | 43.5 | 41.4 | 47.4 | 36.4 | 50.5 | 31.1 |
| 58 | 44.6 | 41.9 | 48.5 | 36.8 | 51.6 | 31.5 |
| 59 | 45.7 | 42.5 | 49.6 | 37.3 | 52.7 | 31.9 |
| 60 | 46.8 | 43.0 | 50.8 | 37.8 | 53.8 | 32.2 |

Consult Your Miter Saw Manual

ANGLE MEASUREMENT TOOL

BACKGROUND OF THE INVENTION

This invention has to do with a measuring tool for use in the construction profession with particular applicability to finish carpentry, framing carpentry, wall layout, drywall installation, fitting countertops, piping layouts, floor and ceiling installations and cabinetry. It also has direct applications in the graphic arts field, the engineering and drafting fields and other manufacturing situations where angle measurements are performed. This invention has direct applications in virtually every situation requiring an angle measurement, and it has a multitude of professional and household applications, providing precise angle readings for any carpentry project and any other project that requires angle measurement, angle copying, angle transferring, and/or angle projection. Such projection of an angle may be accomplished with a laser, scope or other means of projecting or sighting to a distant point, line, plane or planes.

This invention is used in the fitting of trim and decorative pieces, or any material, to the surface of wall surfaces, or any surfaces, which meet at an angular junction. The fitting of said trim or other material to this angular junction converges in a joint which is commonly referred to as a miter joint. A correct miter joint is achieved when the two pieces of trim or other material are cut at equal angles; one to the left and one to the right. A miter saw/miter box is used to cut the trim and decorative pieces, or any material, in a precise manner so that a clean and accurate miter joint is established.

The invention is also used for fitting single pieces of trim, or any material, into any angle that is encountered. A miter saw/miter box is used to cut the material in a precise manner so that a clean and accurate fit is established between the freshly cut piece and the work surface(s).

In addition to the above-mentioned functions, which are specific to the angle scale that is virtually universal to the miter saw/miter box, this invention also has scales for determining the actual angle, or any interpretation of the actual angle, throughout an entire revolution (zero degrees through 360 degrees).

This invention has additional scales for determining, transferring and laying out the angles for common roof pitches. In the preferred embodiment, these scales are laid out in the standard "inches of rise per lineal foot." The indicated roof pitch is simultaneously converted to a miter saw/miter box setting.

While a miter saw/miter box is the preferred and generally most accurate way to achieve the angled cuts determined by the invention, other means such as a hand saw, hand-held circular saw, radial arm saw, table saw, jig saw and any other means for achieving the determined cuts are contemplated by the inventor.

This invention has a laser/scope accessory and provision is made for said laser/scope accessory to be attached to the invention. The union of this invention with the laser/scope accessory provides a means for projecting any angle setting from a chosen point of origin along the angle chosen and out to a distance limited only by the power of the laser/scope. Such a laser/scope projection is useful in the layout of walls and construction angles, regardless of what plane they are in. Such a laser/scope projection is also useful in the electrical, plumbing, drywall and landscaping fields, as well as any trade or endeavor that requires the accurate determination, and/or projection, of any angle. It should be understood that a laser/scope, or lasers/scopes, might also be incorporated in the body of the tool as a permanent fixture(s). All such alternative means for employing a laser(s), scope(s) or other means of projecting or sighting on the measuring tool are contemplated by the inventor.

BRIEF SUMMARY OF THE INVENTION

It is an object of this invention to provide an easy to use tool to transfer angle readings from a work place surface(s) to a miter saw/miter box, to any other cutting device, or directly to any work piece, in a one-step operation.

It is a further object of this invention to measure and/or project with a laser, scope or other means, an angle, its complementary angle, its supplementary angle, common roof pitch angles and/or any angle interpretation to which the several scales might be adapted. In the preferred embodiment all of these angle interpretations are projected and measured simultaneously.

In the preferred embodiment of the invention an angle measurement tool is provided that in its final form is limited to two parts. Both of the parts have a plurality of scale measurements scribed upon them. The tool is so constructed that the movement of the two parts relative to each other will result in an angle being formed there between that will be measured by referring to a setting on the scales so provided.

The tool can be utilized to measure the miter joint angle, bevel and miter settings for compound angles, the actual angle made by the legs of the tool, the complementary angle of the actual angle, the supplementary angle of the actual angle, the common roof pitch angle and/or any angle interpretation to which the several scales might be adapted. In the preferred embodiment, all of these angle interpretations are measured simultaneously. The tool can also be utilized with its laser/scope accessory (or integral laser[s] and/or scope[s]) to measure, layout and project wall angles, construction angles and any angle encountered or required. This improvement is accomplished by attaching the twin-beamed laser/scope to the invention and projecting/sighting a line along a chosen angle from a known point to any other point along the laser beam(s) or sighted line(s). Said point, or points, along the projected laser beam(s), or sighted line(s), must be located in order to achieve a proper rendition of the angle required, and the laser/scope accessory achieves that purpose in a one-step operation. It should be understood by those practiced in the art that many additional deployments of lasers or scopes might be employed for a variety of angle projections that are calculated by the measuring tool. The laser, or lasers, can be used to project planes as well as points along a line. These lasers can be deployed in many useful layouts that are directly related to any of the many angle functions to which the tool can be calibrated. It should be further understood that said laser(s), or scope(s), might also be integrated into the measuring tool, in addition to, or as an alternative to the laser (or scope) accessory.

BRIEF DESCRIPTION OF THE DRAWINGS

FIGS. 2A, 2B, and 2C are plan views of bottom leg 18.
FIG. 2D is a 'reverse side' plan view of bottom leg 18.

FIGS. 10A, 10B and 10C are plan views of bottom leg 18.

FIGS. 11A, 11B and 11C are plan views of assembly pin 16.

FIG. 12 is a cut-away end view, through the tool's axis, of tool 10.

FIG. 13 is an exploded view of tool 10 with leg 14 in the 'reverse side' or alternate position.

FIGS. 14A, 14B, 14C and 14D are plan views of the Laser Pointer/Scope Improvement 80.

FIG. 15 is a perspective view of the Laser Pointer/Scope Improvement 80.

FIGS. 16A, 16B and 16C are plan views of the mounting plate accessory 90 for the Laser Pointer/Scope Improvement 80.

FIG. 17 is a perspective view of the mounting plate accessory 90 for the Laser Pointer/Scope Improvement 80.

FIG. 18 illustrates the Compound Angle Conversion Table 110.

DETAILED DESCRIPTION OF THE INVENTION

Figure 4:
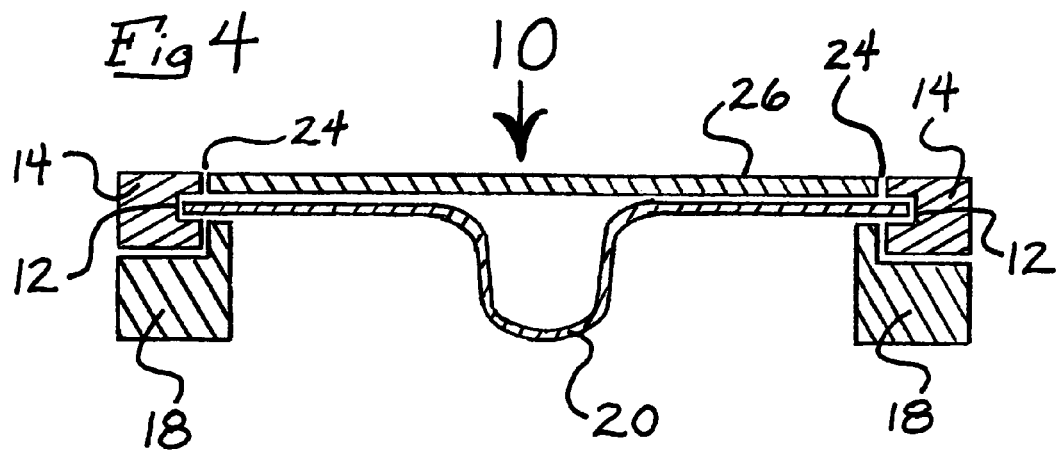
FIG. 4 is a cut-away end view, through the tool's axis, of tool 10.
Figure 5:
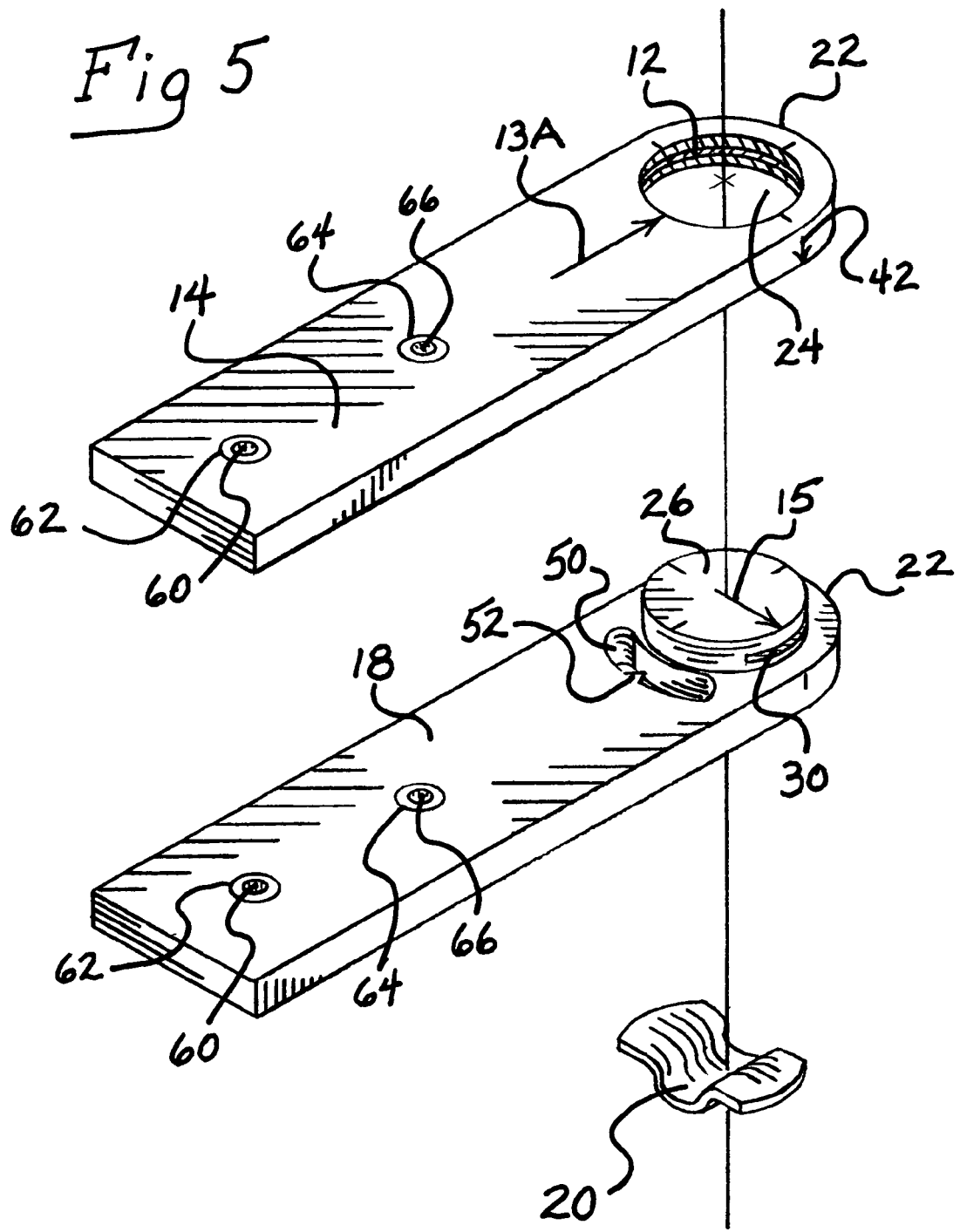
FIG. 5 is an exploded view of tool 10.
Figure 6:
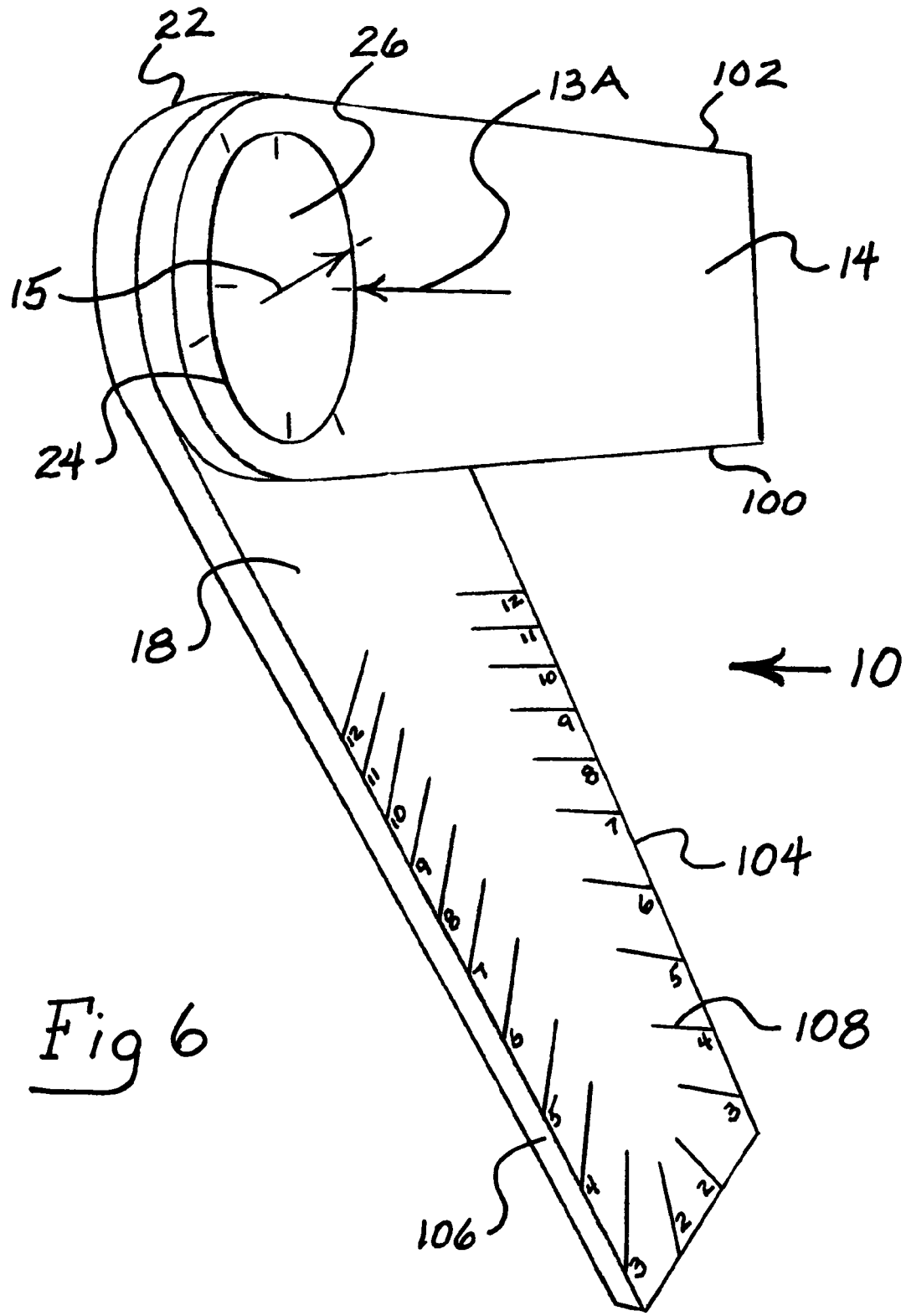
FIG. 6 is a perspective view of all of the components of tool 10 as assembled with the legs forming an acute angle.
Figure 7:
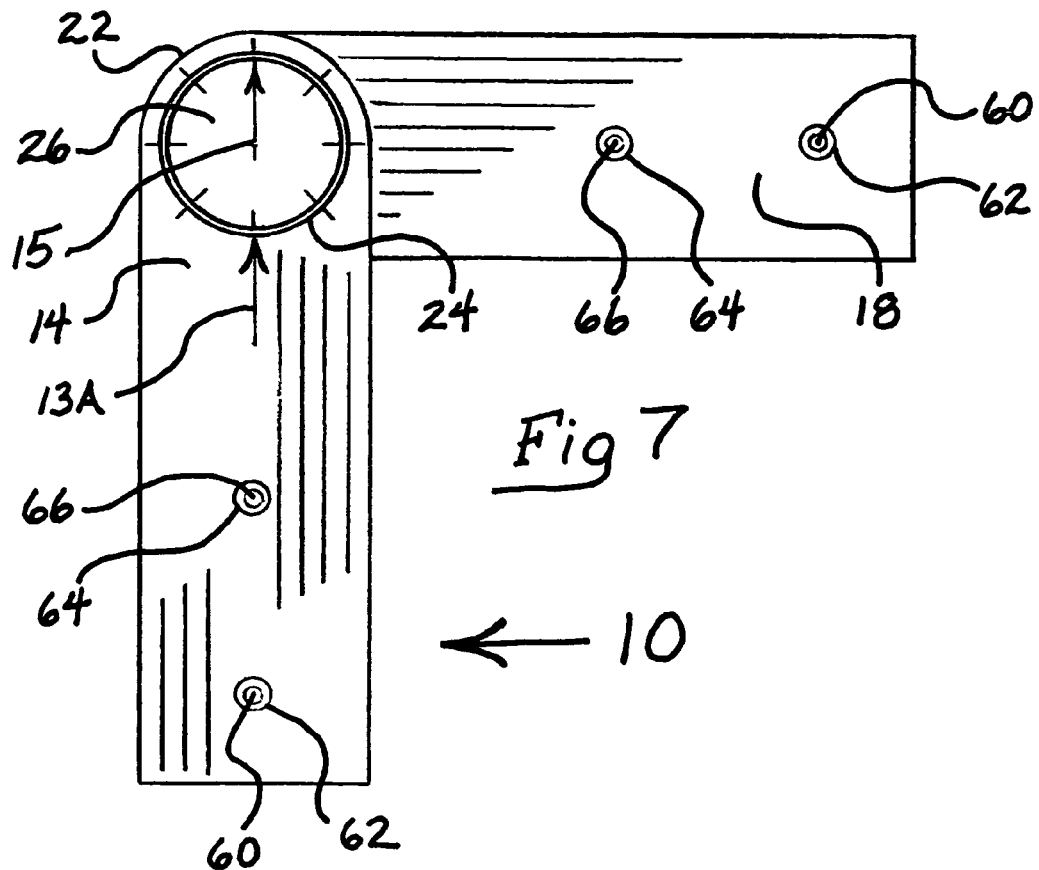
FIG. 7 is a top view of tool 10.
Figure 8:
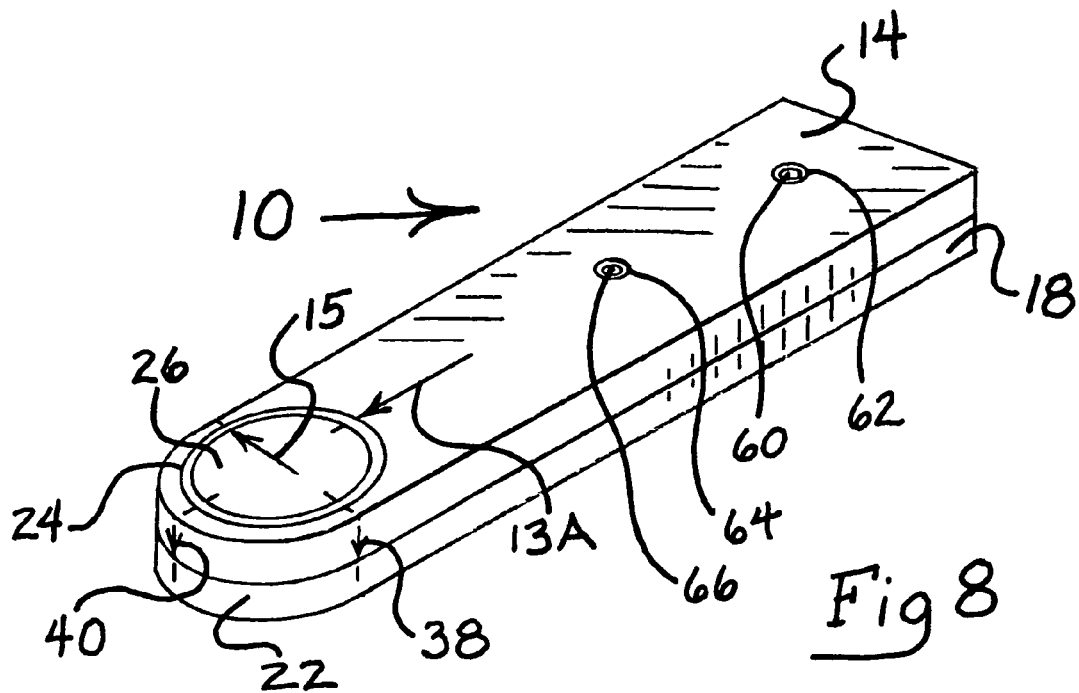
FIG. 8 is a perspective view of tool 10 in a closed position.

As can be seen in the FIGS. 1-8 the preferred embodiment of angle measurement tool 10 is constructed from several components including top leg 14, bottom leg 18 and assembly spring 20. Legs 14 and 18 are the same width and both have a circular shaped end 22. It should be understood that circular end 22 of both leg 14 and leg 18 is a semicircle of a circle having a diameter equal to the width of leg 14 and leg 18. It should be further understood that leg 14 and leg 18 might be wider or narrower than circular end 22 where the legs extend beyond the circle described by end 22. It should also be understood that leg 14 and leg 18 might have non-parallel edges and tool 10 will still function as intended. Opening 24 in leg 14 is provided at the center of the circle of which end 22 is a part. Projected axis spindle/dial 26 of bottom leg 18 is provided at the center of the circle of which end 22 is a part. In the preferred embodiment, projected axis spindle/dial 26 is circular in shape and has a diameter equal to or less than the diameter of opening 24, as shown in the figures. It should be understood that projected axis spindle/dial 26 has a diameter equal to or less than the diameter of the opening 24 as a function of the assembly of tool 10 and in order to facilitate placing indicia on that top surface of leg 14 which surrounds projected axis spindle/dial 26 and further, does not have to be in the shape of a circle in order for tool 10 to operate in the fashion described. As can be seen in FIGS. 1A, 1B, 1C and 1D groove 12 is recessed into top leg 14 around the perimeter of opening 24 for reasons that will be apparent below. Openings 30 are provided in projected axis spindle/dial 26 for reasons that will be apparent below. As can be seen in FIG. 5 the components of tool 10 are assembled such that opening 24 of leg 14 is positioned around projected axis spindle/dial 26 of leg 18 so that the openings 30 and groove 12 in leg 14 align. Assembly spring 20 is then inserted through openings 30 into groove 12. The fit, tension and frictional properties of assembly spring 20 maintain leg 14 and leg 18 in a steady position for an accurate reading of the measured angle. In the preferred embodiment assembly spring 20 has two ends and openings 30 are two in number. It should be understood by those practiced in the art that spring 20 may have a configuration with one, two or more ends. It should be further understood that opening(s) 30 may number one, two or more. Other position adjustment mechanisms are contemplated in alternative embodiments of the invention. It should be apparent to anyone practiced in the art that there are many ways to effect the union of leg 14 and leg 18 by means projecting through openings 30 into groove 12. These means may be cam actuated, lever actuated, actuated by threaded devices, locking push-button or any of a multitude of means obvious to anyone practiced in the art. The inventor contemplates all such means of attachment and adjustment. It should be understood that projected axis spindle/dial 26 may or may not be constructed in union with leg 18, but in its final form tool 10 comprises a bottom leg 18 that is in fixed union with projected axis spindle/dial 26. As can be seen in FIG. 4 opening 24 of leg 14 fits around projected axis spindle/dial 26 of leg 18 such that the top surface of projected axis spindle/dial 26 is co-planar with the top surface of leg 14 after the components of tool 10 are assembled. It should be understood that the top surface of projected axis spindle/dial 26 does not have to be co-planer with the top surface of leg 14. Assembly spring 20 is passed through openings 30 from the bottom of leg 18 into groove 12 in leg 14. This provides precisely pivoting legs 14 and 18. It is recognized that leg 14 is the only moving part of tool 10 when being used to measure an angle for a miter joint reading or any other angle reading to which tool 10 is adapted. Arrow 13A is provided on the top surface of leg 14 as shown in the figures. Arrow 13B is provided on the bottom surface of leg 14. It should be understood that the design of tool 10 is such that leg 14 may be assembled with the top or bottom surfaces in interchangeable positions relative to leg 18. In other words, leg 14 is reversible in relation to leg 18 when the two parts are united by use of assembly spring 20 to form tool 10. The reversible nature of leg 14 provides additional means for calculating angle interpretations. Arrows 38, 40 and 42 are provided on the radial surface of leg 14 as shown in FIGS. 5 and 8. In operation tool 10 simultaneously provides the miter joint angle measurement, the actual angle made by the legs 14 and 18, the complementary angle measurement of the actual angle, the supplementary angle measurement of the actual angle, roof pitch angles and/or any angle interpretation to which the several scales are adapted. In the preferred embodiment projected axis spindle/dial 26 is provided with indexing markings that are representative of the miter joint angle reading. Specifically, arrow 13A or 13B points to the marking on projected axis spindle/dial 26 that is the miter joint reading. Arrow 15 is provided on the top surface of projected axis spindle/dial 26 of leg 18 providing a reading of any angle interpretation chosen for the scales placed on the top, bottom, edge or radial surfaces of leg 14. The indexing provided on the radial surface of leg 18 measures the actual angle reading via arrow 38; the complementary angle reading via arrow 40 and the supplementary angle reading via arrow 42. Alternative embodiments are contemplated by the inventor in which a wide variety of angle readings may be accomplished on the top surfaces, bottom surfaces and edges of either or both of legs 14 and 18, as well as on projected axis spindle/dial 26.

Figure 9A:
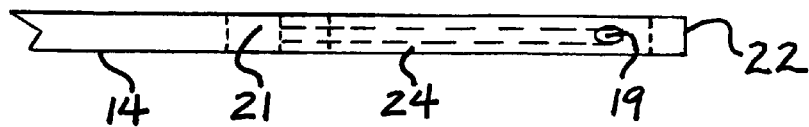
FIGS. 9A, 9B and 9C are plan views of top leg 14.
Figure 9B:
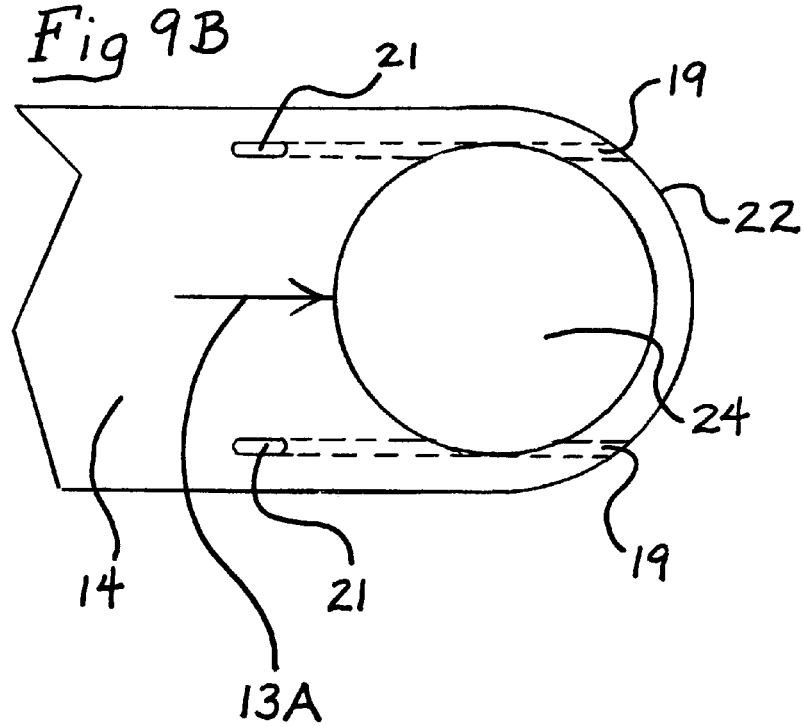
Figure 9C:
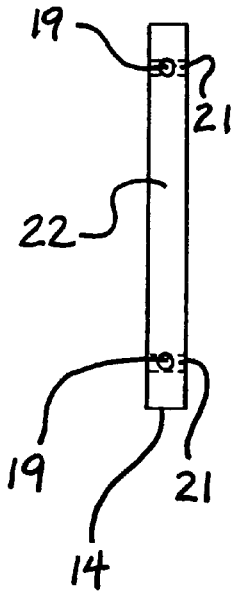

FIGS. 9A, 9B, 9C, 10A, 10B, 10C, 11A, 11B, 11C, 12 and 13 disclose an alternative embodiment in which leg 18 is provided with a projected axis spindle/dial 27. Projected axis spindle/dial 27 is provided at the center of the circle of which end 22 is a part. Leg 14 is provided with assembly pin holes 19 for reasons that will be apparent below. Assembly pins 16 are provided for reasons that will be apparent below. As can be seen in FIGS. 10A, 10B and 10C groove 17 is recessed into projected axis spindle/dial 27 around its entire circumference for reasons that will be apparent below. As can be seen in FIGS. 9A, 9B and 9C assembly pin holes 19 are provided in positions on leg 14 such that they will join leg 14 to projected axis spindle/dial 27 of leg 18 when assembly pins 16 are inserted in pin assembly holes 19. The pin assembly holes 19 and the groove 17 are sized such that assembly pins 16 secure leg 14 and leg 18 together into tool 10. In the preferred embodiment assembly pins 16 are the same shape as, and fit snugly into, assembly pin holes 19 and are snugly tangent to groove 17 providing sufficient friction to maintain leg 14 and leg 18 in a steady position for an accurate reading of the measured angle. This provides precisely pivoting legs 14 and 18. It is recognized that leg 14 is the only moving part of tool 10 when being used to measure an angle for a miter joint reading or any other angle reading to which tool 10 is adapted. Openings 21 are provided in leg 14 for removal of assembly pins 16. The assembly pins 16 are retained in place by the snug friction fit provided by assembly pin holes 19. A small nail or similar object is inserted in openings 21 and the nail is used to push the assembly pins 16 out of assembly pin holes 19 sufficiently far so that the assembly pins 16 may be grasped and removed far enough to disengage groove 17 allowing leg 14 and leg 18 to be disassembled. It should be understood that the design of tool 10 is such that leg 14 may be assembled with the top or bottom surfaces in interchangeable positions relative to leg 18. In other words, leg 14 is reversible in relation to leg 18 when the two parts are united by use of assembly pins 16 to form tool 10. The reversible nature of leg 14 provides additional means for calculating angle interpretations. Arrow 15 is provided on the top surface of projected axis spindle/dial 27 of leg 18 providing a reading of any angle interpretation chosen for the scales placed on the top, bottom, edge or radial surfaces of leg 14. It should be understood by anyone practiced in the art that pin and pin retention designs of many different forms and means are contemplated by the inventor. These forms of retention include, but are not limited to: threading assembly pins 16 such that they are secured in threads located in assembly pin holes 19, magnetism, latching means or a friction producing substance. It should be further understood that the assembly pins 16 may be fewer that two or more than two.

It should be understood by anyone practiced in the art that there are an infinite number of arrangements of interlocking "pins", "springs", "cams", "clips", "catches", "levers", "latches", "screws", "projections", "magnetic devices", "holes", "grooves" and "openings" that will secure projected axis spindle/dial 26 or 27 of leg 18 and leg 14 together such that they provide tool 10 with a leg 14 that revolves securely and accurately around projected axis spindle/dial 26 or 27 of leg 18. The inventor contemplates all of these embodiments, including 'snap-together' designs and designs employing spring loaded ball catches (with or without an 'easy release' button) in addition to those represented in the figures.

As can be seen in FIG. 6 the top surface of leg 18 is provided with indicia 108 permanently affixed (or etched, printed, engraved, etc.) that provide readings for the common roof pitch angles. In the preferred embodiment the common roof pitch angles are expressed in the conventional format of "Inches of Rise Per Linear Foot". For example, a '3 in 12' common roof pitch refers to the angle created by a 12" horizontal line and a 3" vertical line in which the 3" vertical line originates at either end of the 12" horizontal line. It is understood, by definition, that the horizontal and vertical lines are perpendicular to each other. The angle in question is contained within the triangle described by said 3" and 12" lines. The hypotenuse of said triangle, in combination with said 12" line, illustrates the angle of the aforementioned '3 in 12' common roof pitch. The indicia 108 is utilized by viewing and reading either of the edges 100 or 102 on leg 14 at the place where those edges 100 and 102 align with the indicia 108 on leg 18. Similarly, the bottom surface of leg 14 may have such an indicia 108 and it would then be viewed and read by either of the edges 104 or 106 on leg 18. It should be understood that said form of indicia 108 is not intended to be limited to the reading of common roof pitches. It is the inventor's intention that said form of indicia 108 might be used for any of the angle readings mentioned on these pages as well as any angle reading that such indicia 108 can be adapted to. It should be further understood that the common roof pitch angles can be placed on any of the dials, surfaces or edges of the invention where said dials, surfaces and edges interplay in such a way as to provide a relationship between the parts that enables a consistent and predictable angle reading that can be scaled and read. It should be further understood that any number of different scales can be deployed on any of the dials, surfaces or edges of the invention, throughout an infinite number of conceivable angle layouts. The inventor contemplates all such variations of the layout of the scales and indicia.

As can be seen in FIG. 7, leg 18 is provided with two inserts 62 and 64 permanently fixed on a line parallel to the leg 18 side of the angle made by the legs 14 and 18. In the preferred embodiment inserts 62 and 64 are flush with the bottom surface of leg 18. Inserts 62 and 64 are entirely contained between the bottom and top surfaces of leg 18. Inserts 62 and 64 house locating holes 60 and 66 for reasons that will be apparent below. Inserts 62 and 64 may be similarly placed in leg 14, as shown in FIGS. 7 and 8. In the preferred embodiment inserts 62 and 64 are steel, either magnetized or not magnetized. It should be understood that inserts 62 and 64 provide holes 60 and 66 that are perpendicular to the bottom surface of leg 18 and/or the top surface of leg 14. Inserts 62 and 64 pass through either or both legs 14 and 18 such that the function of inserts 62 and 64 and holes 60 and 66 is identical from either the top or bottom surfaces of leg 18 and/or leg 14. It should be further understood that inserts 62 and 64 might be made of materials other than steel. It should be further understood that inserts 62 and 64 can be substituted for by holes 60 and 66 passing directly through the material of leg 18 and/or leg 14. It should be further understood that inserts 62 and 64 and holes 60 and 66 may not necessarily pass entirely through leg 18 and/or leg 14 and thus it is possible to place inserts 62 and 64 and likewise holes 60 and 66 on either or both of the top and bottom surfaces of either or both of legs 14 and 18. Holes 60 and 66 may be of the same shape as each other or they may be unique shapes. FIGS. 14A, 14B, 14C, 14D and 15 illustrate laser device 80 for projecting diametrically opposed laser beams 84 and 86 in diametrically opposite directions from each other. Laser device 80 is fitted with two pegs 68 and 70 that precisely match the shape or shapes of holes 60 and 66. Pegs 68 and 70 may be of the same shape as each other or they may be unique shapes. Pegs 68 and 70 are fit perpendicular to the bottom surface 88 of laser device 80. Bottom surface 88 is in a single plane. Bottom surface 88 is parallel with laser beams 84 and 86. The distance between the center of pegs 68 and 70 is exactly the same distance that is between the center of holes 60 and 66. Laser beams 84 and 86 are in a line parallel to the line passing through the center of pegs 68 and 70 where pegs 68 and 70 penetrate bottom surface 88. In the preferred embodiment pegs 68 and 70 are circular and made of steel, either magnetized or not magnetized. It should be understood that other shapes and materials are contemplated for pegs 68 and 70. It should also be understood that magnetic attachment is one of many means contemplated for attaching laser device 80 to leg 18 and/or leg 14. Battery compartment 82 is provided to contain batteries for energizing laser beams 84 and 86. Laser beams 84 and 86 may be generated from a single source and redirected on diametrically opposite paths. Laser beams 84 and 86 may also be generated separately. Laser beams 84 and 86 may be generated not only as single lines, but might also be projected as planes or any number of planes.

In operation laser device 80 is affixed to tool 10 by placing pegs 68 and 70 in holes 60 and 66. It should be recognized by those practiced in the art that various other means of attaching laser device 80 to tool 10 are possible and those ways are contemplated by the inventor. Laser beams 84 and 86 are employed to project an angle. In the preferred embodiment, the union of tool 10 and laser device 80 projects laser beams 84 and 86 along one side of the angle made by the legs 14 and 18. The other side of the angle made by the legs 14 and 18 represents the base line from which the particular angle is being calculated and projected. Whichever of the legs 14 and 18 that does not have the laser device 80 mounted on it is the leg that is set parallel to the base line. Either laser beam 84 or laser beam 86 point in the direction of, or parallel to, the axis of legs 14 and 18. Laser beams 84 and 86 are by design always parallel to one side of the angle being measured and projected. Laser beams 84 or 86 may pass over, across or beside the axis of legs 14 and 18. Laser beam 84 or 86 is aimed at the spring point of the angle that is to be projected. The opposite laser beam (either 84 or 86), the one not aimed at the spring point of the angle, projects the chosen angle along and beyond the angle made by the legs 14 and 18. It should be understood by those practiced in the art that there are alternative embodiments for a laser, or lasers, in which the laser function(s) are an integral part of tool 10 in addition to laser device 80, or in place of laser device 80. All such alternative embodiments are contemplated by the inventor. It should be understood that sighting scopes may be substituted for, or mounted in unison with, the laser beam in laser device 80.

FIGS. 16A, 16B, 16C and 17 illustrate a mounting plate 90 which is provided for employing the laser device 80 independently from tool 10. Mounting plate 90 has coplanar top 94 and bottom 92 surfaces. Mounting plate 90 includes inserts 62 and 64 with holes 60 and 66 placed in the exact same relation as they are on leg 18 and/or leg 14. It should be further understood that inserts 62 and 64 can be substituted for by holes 60 and 66 passing directly through the material of mounting plate 90. In operation mounting plate 90 provides a smooth and flat surface 92 beneath bottom surface 88. Mounting plate 90 is sufficiently thick to house pegs 68 and 70 such that they do not interfere with the use of laser device 80 on any flat surface.

Figure 1A:
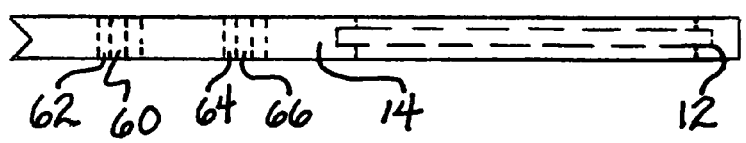
FIGS. 1A, 1B, and 1C are plan views of top leg 14.
Figure 1B:
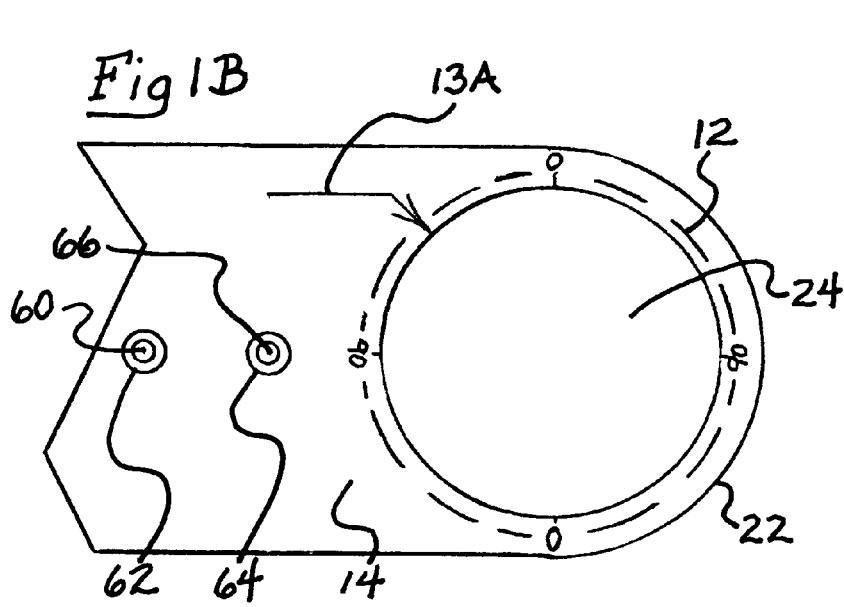
Figure 1C:
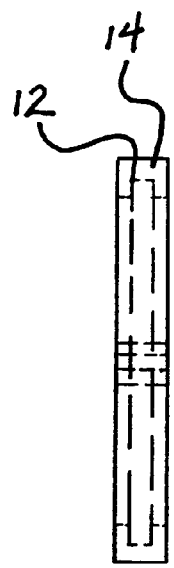
Figure 1D:
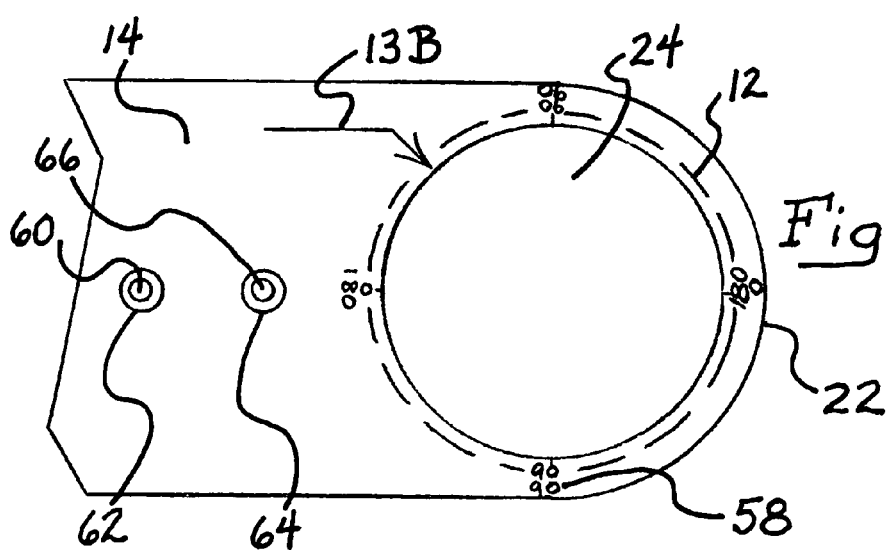
FIG. 1D is a 'reverse side' plan view of top leg 14.
Figure 3A:
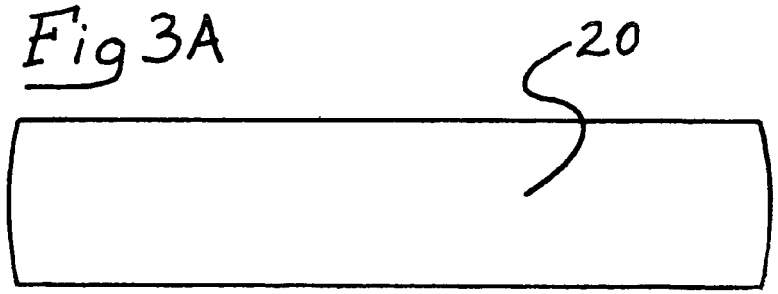
FIGS. 3A, 3B and 3C are plan views of assembly spring 20.
Figure 3B:
Figure 3C:
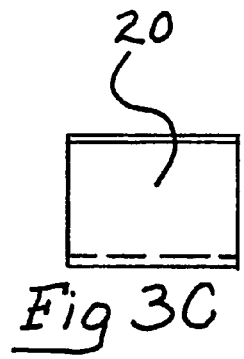

Referring to FIG. 1D it can be seen that the bottom surface of leg 14 is also provided with a permanently affixed (or etched, printed, engraved, etc.) indicia 58 radiating throughout 360 degrees from the center of the circle of which ends 22 are a part. In the preferred embodiment indicia 58 is circular in shape and has a diameter equal to the width of legs 14 and 18 as shown in the drawings. It should be understood that indicia 58 could have a diameter less than the width of legs 14 and 18 within the circle described by end 22, and further, does not have to be in the shape of a circle in order for tool 10 to operate in the fashion described. As can be seen in FIGS. 2A, 2B, 2C, 2D and 5 leg 18 is provided with opening 50 through which indicia 58 can be viewed. Opening 50 can be any shape (notches, holes, bevels, etc.) that permits viewing any portion of indicia 58.

Multiple openings similar to 50 may be employed simultaneously. In the preferred embodiment pointer/arrow 52 is provided in opening 50. In the preferred embodiment, indicia 58 is arranged to indicate the actual angle created between the two legs 14 and 18 at any moment throughout a three hundred sixty degree revolution relative to each other. For example, in the preferred embodiment, either of the two scales on indicia 58 will indicate ninety degrees when legs 14 and 18 are rotated to a position in which they are at a right angle to each other. For further example, in the preferred embodiment legs 14 and 18 will indicate the actual angle on indicia 58 on the two scales originating at zero degrees and one hundred eighty degrees, respectively, when tool 10 is in the closed position, wherein legs 14 and 18 are perfectly mated face to face. One of the scales on indicia 58 will thus range from zero degrees through to one hundred eighty degrees and back to zero degrees as it travels through a full three hundred sixty degree revolution. The other scale on indicia 58 will range, conversely, from one hundred eighty degrees through to zero degrees and back to one hundred eighty degrees as it travels through a full three hundred sixty degree revolution. In this embodiment of indicia 58 the two scales provide indication of the actual angle in both of the two possible interpretations of the actual angles created by the interrelation of legs 14 and 18. In the preferred embodiment indicia 58 provides two scales that simultaneously indicate the actual angle and its supplement throughout both halves of a full three hundred sixty degree revolution of legs 14 and 18 in relation to each other. In operation this feature provides additional means on tool 10 for the reading of angles. The layout of indicia 58 can be altered to employ any interpretation of the angles created by the movement of legs 14 and 18 in relation to each other, and the inventor contemplates each alternative layout of indicia 58.

FIG. 18 illustrates the table 110 that is used to convert the miter joint reading, indicated on projected axis spindle/dial 26 or 27 by arrow 13A or 13B, into the miter and bevel cuts required to execute a compound cut. This is accomplished simply by reading the miter cut table 110 horizontally across from the indicated miter joint reading in the miter cut column 112 to ascertain the appropriate miter and bevel cuts required for either of the three standard crown moulding pitch angles as shown in column 114, column 115 and column 116. Additional embodiments of the table should be obvious to those skilled in the art. The inventor contemplates all such additional embodiments of the table. Multiple tables may also be employed. Table 110, as well as those additional tables contemplated, is/are to be placed anywhere on the surfaces of leg 14 and/or leg 18 that will suitably accommodate them.

Although specific embodiments of the invention have been described it should be recognized that additional modification and other alternative embodiments may be apparent to those skilled in the art.

The invention claimed is:

1. An angle measurement tool comprising; a first segment having first index means, a second segment having second index means, and a removable position adjustment means; said first segment having a portion thereof located in an opening of said second segment, said removable position adjustment means located in said opening of said second segment and interacting with said first segment to insure accurate angle measurement, wherein said first and second segments are connected for rotation around a common axis to simultaneously measure the actual angles, complementary angles, supplementary angles, roof pitches, gradients and compound angles made by said first segment with respect to said second segment utilizing said first and second index means and wherein said removable position adjustment means is at least one member an end of which is located along the circumference of said opening of said second segment.

2. The angle measurement tool of claim 1 wherein there is an opening in said first segment which allows viewing of said second indexing means located on the surface of said second segment.

3. The angle measurement tool of claim 2 wherein there is a laser means mounted on either said first or second segments to project the line of a particular angle.

4. The angle measurement tool of claim 1 wherein there is a laser means mounted on either said first or second segments to project the line of a particular angle.

5. The angle measurement tool of claim 1 wherein said second indexing means is located on two different surfaces of said second segment.

6. The angle measurement tool of claim 5 wherein said second segment is reversible.

7. The angle measurement tool of claim 1 wherein said second segment is reversible.

8. An angle measurement tool comprising; a first segment having first index means, a second segment having second index means, and removable position adjustment means comprised of at least one elongated member, said first segment having a portion thereof located in an opening of said second segment, said removable position adjustment means located in said opening of said second segment and interacting with said first segment to insure accurate angle measurement, wherein at least one said elongated member is located on the outer circumference of said portion of said first segment and said first and second segments are connected for rotation around a common axis to simultaneously measure the actual angles, complementary angles, supplementary angles, roof pitches, gradients and compound angles made by said first segment with respect to said second segment utilizing said first and second index means.

9. The angle measurement tool of claim 8 wherein there is an opening in said first segment which allows viewing of said second indexing means located on the surface of said second segment.

10. The angle measurement tool of claim 9 wherein there is a laser means mounted on either said first or second segments to project the line of a particular angle.

11. The angle measurement tool of claim 8 wherein there is a laser means mounted on either said first or second segments to project the line of a particular angle.

12. The angle measurement tool of claim 8 wherein said second indexing means is located on two different surfaces of said second segment.

13. The angle measurement tool of claim 12 wherein said second segment is reversible.

14. The angle measurement tool of claim 8 wherein said second segment is reversible.

* * * * *